(12) United States Patent
Wang et al.

(10) Patent No.: US 8,065,509 B2
(45) Date of Patent: Nov. 22, 2011

(54) PERSISTENT SECURITY SYSTEM AND METHOD

(75) Inventors: Lan Wang, Houston, TX (US); Valiuddin Y Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 11/527,272

(22) Filed: Sep. 26, 2006

(65) Prior Publication Data

US 2008/0077800 A1 Mar. 27, 2008

(51) Int. Cl.
G06F 9/00 (2006.01)
G06F 7/04 (2006.01)
G08B 29/00 (2006.01)

(52) U.S. Cl. .............. 713/2; 713/187; 726/28; 726/35

(58) Field of Classification Search .............. 713/1–2, 713/187; 719/313–317; 726/34–35, 28
See application file for complete search history.

(56) References Cited

U.S. PATENT DOCUMENTS

| | | | |
|---|---|---|---|
| 4,937,861 A * | 6/1990 | Cummins | 380/2 |
| 5,226,168 A * | 7/1993 | Kobayashi et al. | 703/25 |
| 5,483,649 A * | 1/1996 | Kuznetsov et al. | 726/22 |
| 6,148,387 A | 11/2000 | Galasso et al. | |
| 6,510,512 B1 | 1/2003 | Alexander | |
| 6,539,480 B1 * | 3/2003 | Drews | 713/191 |
| 7,350,081 B1 * | 3/2008 | Best | 713/190 |
| 2003/0037282 A1 * | 2/2003 | Berg et al. | 714/11 |
| 2005/0044404 A1 | 2/2005 | Bhansali et al. | |
| 2005/0111664 A1 * | 5/2005 | Ritz et al. | 380/255 |
| 2005/0114686 A1 * | 5/2005 | Ball et al. | 713/193 |
| 2005/0235135 A1 * | 10/2005 | Dao et al. | 713/1 |
| 2006/0200679 A1 * | 9/2006 | Hawk et al. | 713/183 |
| 2006/0203736 A1 * | 9/2006 | Molen et al. | 370/245 |
| 2006/0259819 A1 * | 11/2006 | Connor | 714/38 |

FOREIGN PATENT DOCUMENTS

| | | |
|---|---|---|
| JP | 2001-051858 | 2/2001 |
| WO | 9843151 | 10/1998 |
| WO | WO 9843151 A1 * | 10/1998 |
| WO | 2005096122 | 10/2005 |
| WO | WO-2005-096122 | 10/2005 |

OTHER PUBLICATIONS

International Search Report dated Apr. 22, 2008.
EP examination report, dated Jul. 9, 2009, pp. 3.
Chinese First Office Action dated Jul. 30, 2010, pp. 4.
Computerworld Get Technology Right, vol.2, No.8 IDG Japan Inc., Aug. 1, 2005, vol.2, pp. 88-95, JP.
JP Notice of Rejection, Appln No. P2009-529281, date of mailing May 31, 2011, 3 p.
ProtectDrive, Windows Server World, vol. 10 No. 12 IDG Japan Inc., Dec. 1, 2005, vol. 10, p.192, JP.
Translation of COMPUTERWORLD Get Technology Right, vol.2, No. 8 IDG Japan Inc., Aug. 1, 2005, vol. 2, pp.88-95, JP.
Translation of JP Notice of Rejection, Appln. No. P2009-529281, date of mailing May 31, 2011, 3 p.
Translation of ProtectDrive, Windows Server World, vol. 10 No. 12, IDG Japan Inc., Dec. 1, 2005, vol. 10, p.192, JP.

* cited by examiner

Primary Examiner — Kambiz Zand
Assistant Examiner — Michael Guirguis

(57) ABSTRACT

A persistent security system comprises a computing system comprising an operating system (OS), a basic input/output system (BIOS) and a hard disk drive (HDD), the OS configured to initiate a call to the BIOS to cause the BIOS to write an instance of a security routine to the HDD.

20 Claims, 2 Drawing Sheets

PERSISTENT SECURITY SYSTEM AND METHOD

BACKGROUND

Computing systems sometimes utilize full volume/full disk encryption for a hard disk drive (HDD) where data is stored to the HDD in an encrypted format and must then be decrypted before providing the data to a user or another application. However, because of the encrypted state of the HDD, operations relating to getting data from or writing data to the HDD must generally be postponed until a key or other type of decryption component is obtained or generated (e.g., in response to an authentication operation), thereby resulting in HDD accessibility limitations, especially during booting of the computing system.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
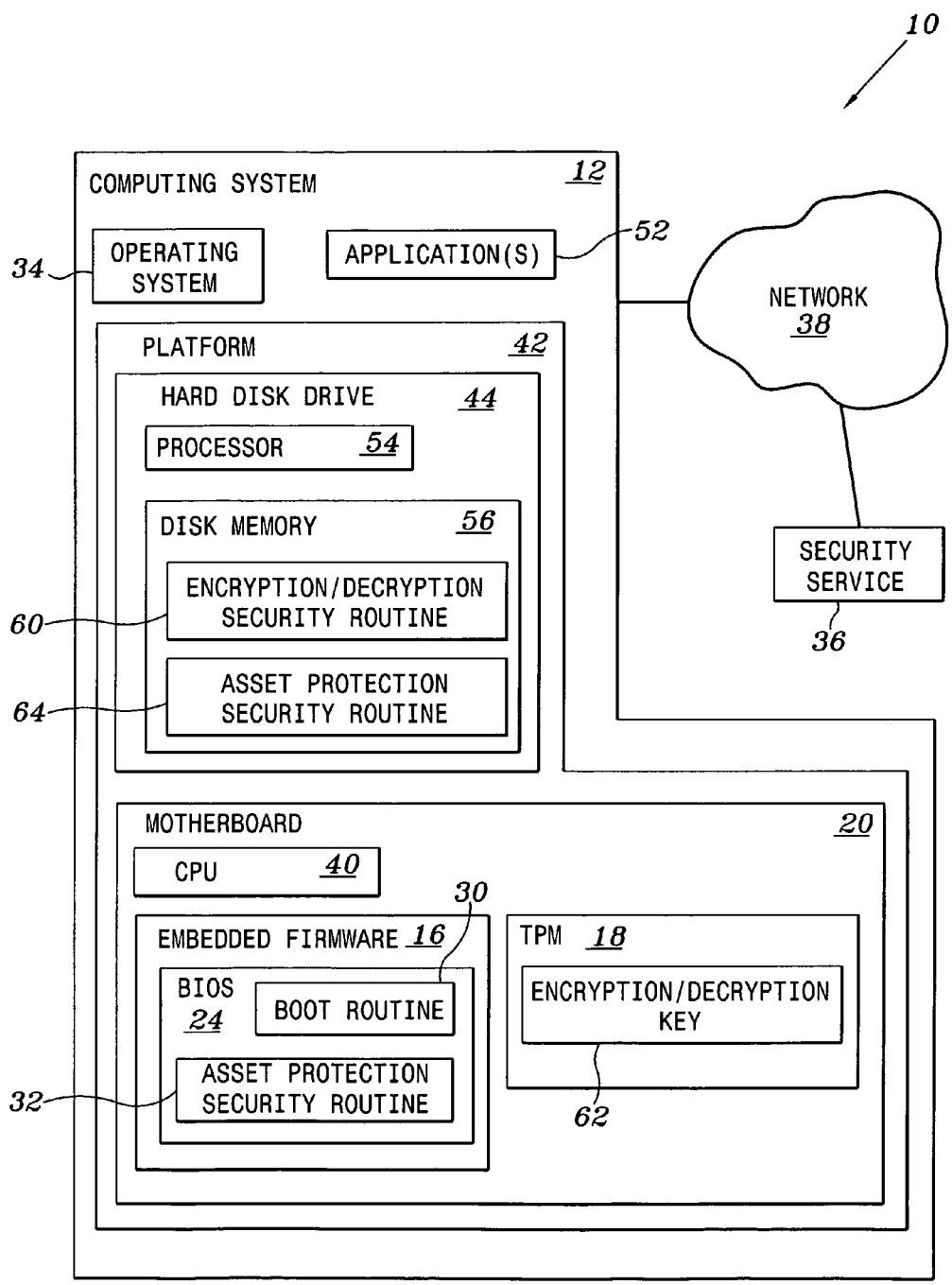
FIG. 1 is a diagram illustrating an embodiment of a persistent security system.
Figure 2:
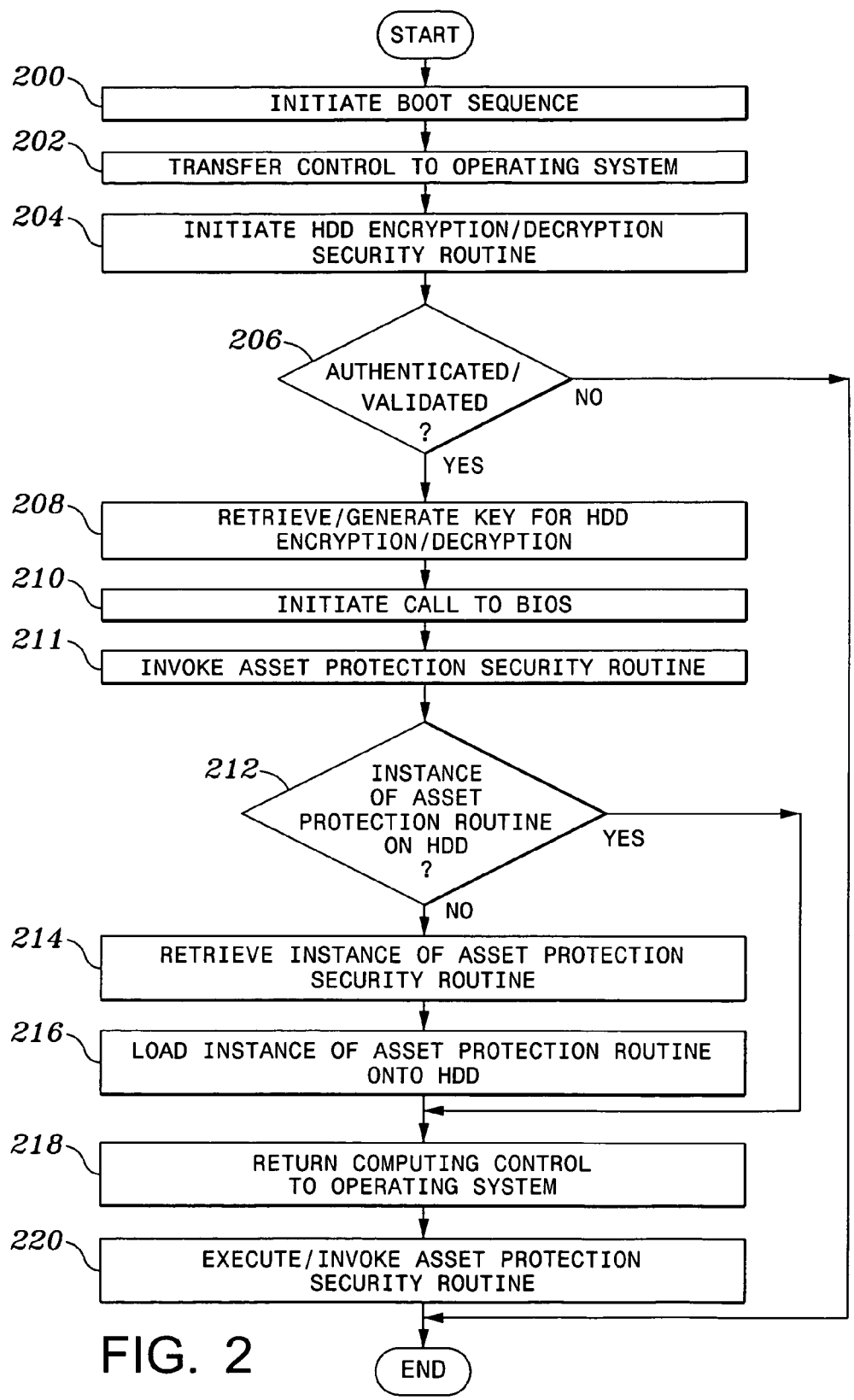
FIG. 2 is a flow diagram illustrating an embodiment of a persistent security method.

The preferred embodiments of the present invention and the advantages thereof are best understood by referring to FIGS. 1 and 2 of the drawings, like numerals being used for like and corresponding parts of the various drawings.

FIG. 1 is a block diagram illustrating an embodiment of a persistent security system 10. Briefly, embodiments of system 10 provide a persistent security component in a computing system that is automatically loaded onto an encrypted hard disk drive (HDD) (and/or its presence on the encrypted HDD verified) by a basic input/output system (BIOS) such that each time a computing system in which the HDD resides is booted, the security component is available from the HDD to an operating system for execution thereof. Thus, even if the security component has been inadvertently or purposely removed/deleted from the HDD, embodiments of system 10 cause the BIOS to automatically reload the security component onto the HDD during booting of the computing system, thereby maintaining its presence on the computing system for each user session of the computing system.

In the embodiment illustrated in FIG. 1, system 10 comprises a computing system 12 having embedded firmware 16 and a trusted platform module (TPM) 18 disposed on a motherboard 20. Computing system 12 may comprise any type of computing device such as, but not limited to, a desktop computer, a notebook computer, a personal digital assistant, and a tablet computer. In the embodiment illustrated in FIG. 1, embedded firmware 16 comprises a BIOS 24 (e.g., stored in a flash memory component) having a boot routine 30 and an asset protection security routine 32 stored therein. Boot routine 30 and security routine 32 comprise a set of instructions executable by a central processing unit (CPU) 40. In some embodiments, boot routine 32 comprises a set of instructions executed during a boot operation of computing system 12 (e.g., in response to a power-on event or in response to a wake event from a sleep, hibernation or other type of reduced-power operating mode) such as, but not limited to, a power-on self-test (POST) routine.

In the embodiment illustrated in FIG. 1, asset protection security routine 32 comprises a set of instructions used as part of an asset tracking and/or reporting system. For example, in some embodiments, asset protection security routine 32 enables an operating system (OS) 34 of computing system 12 to interface with a remote security service 36 via a communication network 38 (e.g., the Internet or other type of wired or wireless communication network) to determine whether a security event exists for computing system 12 and/or provide information to security service 36 to facilitate tracking and/or recovery of computing system 12. A security event for computing system 12 may exist if computing system 12 has been reported to security service 36 as being lost or stolen, for example. Thus, in operation, in response to computing system 12 being connected to communication network 38, asset protection security routine 32 is executed by OS 34 and configured to cause OS 34 to communicate and/or interface with security service 36, thereby enabling security service 36 to take a particular action(s) with respect to computing system 12 if a security event exists for computing system 12 (e.g., logging of an Internet protocol (IP) address and/or other actions) to facilitate tracking and/or recovery of computing system 12. In the embodiment illustrated in FIG. 1, the persistent security component comprises a component for asset tracking security (e.g., the physical computing system 12). However, it should be understood that embodiments of system 10 may be used for other types of security components (e.g., data safeguarding, security credential authentication, etc.).

Generally, TPM 18 is used to store and report the values of measurements (integrity metrics) of certain software and hardware on a platform 42 of system 12. For example, in some embodiments, TPM 18 is used to measure, store and report the integrity of a HDD 44 and embedded firmware 16. However, it should be understood that TPM 18 may be used to store and report the integrity of other devices and/or hardware and is used to securely store platform information and secrets such as passwords, keys and certificates. In the embodiment illustrated in FIG. 1, system 12 also comprises one or more executable applications 52 that may be invoked and/or otherwise executed by OS 34.

In the embodiment illustrated in FIG. 1, HDD 44 comprises a processor 54 and disk memory 56. HDD 44 comprises an encrypted HDD 44 such that data stored to disk memory 56 is stored in an encrypted format. Thus, in the embodiment illustrated in FIG. 1, HDD 44 comprises an encryption/decryption security routine 60 stored in a master boot record sector of disk memory 56 for encrypting data that is to be written to disk memory 56 and decrypting data retrieved from disk memory 56 that is to be provided to a user or a particular application 52. For example, encryption/decryption security routine 60 comprises a set of instructions executable by processor 54 for encrypting data to be stored on disk memory 56 and decrypting data retrieved from disk memory 56. In some embodiments, encryption/decryption security routine 60 is also used to provide HDD 44 decryption authentication needed to obtain and/or otherwise generate a key for encrypting and decrypting data associated with disk memory 56. For example, in some embodiments, encryption/decryption security routine 60 is used to authenticate and/or otherwise validate security information and/or a security credential provided by a user or agent in order to access and/or generate the encryption/decryption key. Thus, in some embodiments, in response to security credential authentication/validation, encryption/decryption security routine 60 causes HDD 44 to interface with TPM 18 to retrieve from and/or otherwise have generated by TPM 18 an encryption/ decryption key 62 used for encrypting data to be stored on HDD 44 and decrypting data retrieved from HDD 44. However, it should be understood that encryption/decryption key 62 may be generated by and/or retrieved from another component (e.g., by OS 34, a particular application 52 or otherwise). It should also be understood that in some embodiments, computing system 12 may be configured without TPM 18.

In operation, an instance of asset protection security routine 32 is written and/or otherwise loaded onto disk memory 56 of HDD 44 by BIOS 24 (indicated as asset protection security routine 64 in FIG. 1). Asset protection routine 64 is preferably executed by OS 34 automatically (i.e., without user action or invocation) such that asset protection routine 64 is running and/or operating in computing system 12 in the background (e.g., essentially invisible to a user of computing system 12). In some embodiments, the instance of asset protection security routine 32 loaded onto disk memory 56 comprises a small token or kernel of information that is used to facilitate a more complete routine being be downloaded onto disk memory 56 from security service 36 upon connection of computing system 12 to network 38. However, it should be understood that system 10 may be otherwise configured. For example, in some embodiments, the more complete routine or program may remain elsewhere (i.e., the more complete routine may remain at a location other than on HDD 44). Further, it should be understood that the instance of asset protection routine 64 loaded onto HDD 44 may comprise a flag, pointer or other element that causes a direction or redirection of action to be followed or processed by OS 34 or another application residing on computing system 12.

In operation, BIOS 24 is configured to automatically load onto disk memory 56 of HDD 44 an instance of asset protection security routine 32 so that OS 34 automatically invokes and/or otherwise executes the instance of asset protection security routine 64 stored on HDD 44 after booting of computing system 12. Preferably, during each boot operation of computing system 12, BIOS 24 is configured to automatically determine whether an instance of asset protection security routine 32 has been stored on HDD 44. For example, an instance of asset protection security routine 32 may not be present on HDD 44 when computing system 12 is booted for the first time or an instance of asset protection security routine 64 previously stored on HDD 44 may have been inadvertently or purposely removed or deleted from HDD 44. Thus, BIOS 24 is configured to automatically load an instance of asset protection security routine 32 onto HDD 44 upon each booting of computing system 12 in the event that an instance of asset protection security routine 32 is absent from HDD 44. Accordingly, in operation, during booting of computing system 12, BIOS 24 interfaces with HDD 44 to determine whether an instance of asset protection security routine 32 is present on disk memory 56. If an instance of asset protection security routine 32 is not present on HDD 44, BIOS 24 causes an instance of asset protection security routine 32 to be automatically loaded and/or stored in disk memory 56 to facilitate execution thereof by OS 34.

Preferably, BIOS 24 verifies the presence, and loads if necessary, an instance of asset protection security routine 32 on HDD 44 each time computing system 12 is booted. However, because HDD 44 is encrypted, during execution of boot routine 30, HDD 44 has not yet been decrypted (i.e., the security authentication operation for obtaining and/or generating encryption/decryption key 62 has not yet been performed by OS 34 such that HDD 44 would be inaccessible by BIOS 24). Accordingly, embodiments of system 10 enable an instance of asset protection security routine 32 to be loaded and/or stored on HDD 44 by BIOS 24 after boot routine 30 has been completed and control of computing system 12 has been transferred to OS 34. In operation, after completion of boot routine 30 by BIOS 24 and transfer of control of computing system 12 to OS 34, and after decryption of HDD 44 by OS 34, OS 34 initiates a call to BIOS 24 to enable BIOS 24 to verify the presence, and load if necessary, an instance of asset protection security routine 32 onto HDD 44. OS 34 is preferably configured to initiate and/or issue a windows management instrumentation (WMI) interface signal or other type of signal call to BIOS 24 to facilitate verification/loading of an instance of asset protection security routine 32 onto HDD 44. Thus, in response to receiving a call from OS 34, BIOS 24 interfaces with HDD 44 to determine whether an instance of asset protection security routine 32 resides and/or is otherwise present in disk memory 56 (e.g., represented as asset protection security routine 64 in FIG. 1). If an instance of asset protection security routine 32 is present on disk memory 56, BIOS 24 returns control of computing system 12 to OS 34. If an instance of asset protection security routine 32 is not present on HDD 44, BIOS 24 automatically causes an instance of asset protection security routine 32 to be loaded onto HDD 44. BIOS 24 then returns control of computing system 12 to OS 34, and OS 34 executes the instance of asset protection security routine 32 residing on HDD 44 (e.g., asset protection security routine 64). In the embodiment described above, OS 34 initiates a call to BIOS 24 and BIOS 24 verifies the presence of an instance of asset protection security routine 32 on HDD 44. However, it should be understood that in some embodiments, such verification may be performed by OS 34, thereby alleviating the need for a call to BIOS 24 if an instance of asset protection security routine 32 on HDD 44 currently resides on HDD 44.

FIG. 2 is a flow diagram illustrating an embodiment of a persistent security method. The method begins at block 200, where BIOS 24 initiates a boot sequence of computing system 12 using boot routine 30. At block 202, BIOS 24 completes its share of the booting process of computing system 12 based on boot routine 30 and transfers control of computing system 12 to OS 34.

At block 204, OS 34 initiates and/or otherwise executes encryption/decryption security routine 60 to facilitate encryption/decryption of data associated with HDD 44. At decisional block 206, a determination is made whether a security credential has been authenticated and/or otherwise validated in order to obtain and/or otherwise generate encryption/decryption key 62. If a security credential has not been authenticated or validated, the method ends as access to any data on HDD 44 (e.g., OS 34) will be prevented. If the security credential has been authenticated or validated at decisional block 206, the method proceeds to block 208, where OS 34 retrieves and/or otherwise obtains encryption/decryption key 62 associated with encrypted HDD 44. At block 210, OS 34 initiates a call to BIOS 24. At block 211, BIOS 24 invokes and/or otherwise executes at least a portion of asset protection security routine 32 to determine whether an instance of asset protection security routine 32 is present on HDD 44.

At decisional block 212, a determination is made whether an instance of asset protection security routine 32 is present on HDD 44. If an instance of asset protection security routine 32 is not present on disk memory 56 of HDD 44, the method proceeds to block 214, where BIOS 24 retrieves an instance of asset protection security routine 32 to load and/or otherwise store on HDD 44. At block 216, BIOS 24 causes an instance of asset protection security routine 32 to be stored on HDD 44. For example, BIOS 24 interfaces with OS 34 to facilitate an instance of asset protection security routine 32 to be stored on HDD 44 in an encrypted format using encryption/decryption key 62 via encryption/decryption security routine 60. At block 218, BIOS 24 returns control of computing system 12 to OS 34. At block 220, OS 34 executes and/or invokes the instance of asset protection security routine 64 stored in HDD 44 (e.g., illustrated as asset protection security routine 64 in FIG. 1). At decisional block 212, if it is determined that an instance of asset protection security routine 32 is present on HDD 44, the method proceeds to block 218, where control of computing system 12 is returned to OS 34.

Thus, embodiments of system 10 enable a persistent security component to be installed on a HDD even when the HDD is configured as being fully encrypted. Embodiments of system 10 maintain the presence of the security component on the encrypted HDD so as to be automatically executable by an operating system by loading the security component to the HDD from embedded firmware after the HDD has been decrypted (i.e., after validation of a security credential and generation/acquisition of an encryption/decryption key for the HDD).

What is claimed is:

1. A persistent security system, comprising:
   a computing system comprising an operating system (OS), a basic input/output system (BIOS) and a hard disk drive (HDD), wherein upon each booting of the computing system, including after a boot sequence by the BIOS and transfer of control of the computing system to the OS, and after decryption of the HDD by the OS, presence of an instance of a security routine on the HDD is verified, wherein the OS is configured to initiate a call to the BIOS to cause the BIOS to write an instance of the security routine to the HDD if an instance of the security routine is absent from the HDD.

2. The system of claim 1, wherein the boot sequence is executed in response to one of a power-on event and a wake event of the computing system.

3. The system of claim 1, wherein the OS is configured to determine whether an instance of the security routine resides on the HDD.

4. The system of claim 1, wherein the BIOS is configured to determine whether an instance of the security routine resides on the HDD.

5. The system of claim 1, wherein the instance of the security routine is written to the HDD in an encrypted format.

6. The system of claim 1, wherein an instance of the security routine resides in the BIOS.

7. The system of claim 1, wherein the OS is configured to obtain a key for decrypting data residing on the HDD.

8. A persistent security method, comprising:
   during each boot operation of a computing system, determining whether an instance of a security routine resides on a hard disk drive (HDD) of the computing system; and
   initiating a call from an operating system (OS) to a basic input/output system (BIOS) of the computing system to cause the BIOS to write an instance of the security routine to the HDD if an instance of the security routine is absent from the HDD,
   wherein initiating the call to the BIOS and writing an instance of the security routine to the HDD is performed after a boot sequence by the BIOS, after transfer of control of the computing system to the OS, and after decryption of the HDD.

9. The method of claim 8, further comprising determining by the OS whether the instance of the security routine resides on the HDD.

10. The method of claim 8, further comprising determining by the BIOS whether the instance of the security routine resides on the HDD.

11. The method of claim 8, further comprising writing the instance of the security routine to the HDD in an encrypted format.

12. The method of claim 8, further comprising retrieving an instance of the security routine from the BIOS for writing to the HDD.

13. The method of claim 8, further comprising obtaining a key for decrypting data residing on the HDD.

14. The system of claim 1, wherein decryption of the HDD comprises validation of a security credential provided by a user and acquisition of a decryption key for the HDD.

15. The system of claim 1, wherein after the instance of the security routine is written to the HDD, the BIOS returns control of the computing system to the OS, and the OS executes the instance of the security routine.

16. The system of claim 1, wherein the security routine comprises an asset protection security routine configured to communicate with a security service via a communication network and facilitate one of tracking and recovery of the computing system if the computing system is one of lost and stolen.

17. The method of claim 8, wherein the boot sequence is executed in response to one of a power-on event and a wake event of the computing system.

18. The method of claim 8, wherein decryption of the HDD comprises validation of a security credential provided by a user and acquisition of a decryption key for the HDD.

19. The method of claim 8, further comprising after writing the instance of the security routine to the HDD, returning control of the computing system to the OS and executing the instance of the security routine.

20. The method of claim 19, wherein executing the instance of the security routine comprises interfacing with a remote security service via a communication network to facilitate one of tracking and recovery of the computing system if the computing system is one of lost and stolen.

* * * * *